US011265796B2

(12) United States Patent
Thubert et al.

(10) Patent No.: US 11,265,796 B2
(45) Date of Patent: Mar. 1, 2022

(54) OVERLAPPING SUBDAGS IN A RPL NETWORK

(71) Applicant: Cisco Technology, Inc., San Jose, CA (US)

(72) Inventors: Pascal Thubert, Roquefort les Pins (FR); Huimin She, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 151 days.

(21) Appl. No.: 16/535,247

(22) Filed: Aug. 8, 2019

(65) Prior Publication Data
US 2021/0045034 A1  Feb. 11, 2021

(51) Int. Cl.
*H04W 40/08* (2009.01)
*H04W 76/11* (2018.01)
(Continued)

(52) U.S. Cl.
CPC ............ *H04W 40/08* (2013.01); *H04L 45/16* (2013.01); *H04W 76/11* (2018.02); *H04W 84/18* (2013.01)

(58) Field of Classification Search
CPC ..... H04W 40/08; H04W 76/11; H04W 84/18; H04L 45/16; H04L 12/56; H04L 12/44; H04L 12/06
See application file for complete search history.

(56) References Cited

U.S. PATENT DOCUMENTS

| 6,850,532 B2 | 2/2005 | Thubert et al. |
| 7,190,678 B2 | 3/2007 | Thubert et al. |

(Continued)

FOREIGN PATENT DOCUMENTS

| KR | 101208400 B1 | 12/2012 |
| KR | 101755596 B1 | 7/2017 |

OTHER PUBLICATIONS

Thubert et al., "Root initiated routing state in RPL", [online], ROLL Internet Draft, May 24, 2019, [retrieved on Jul. 25, 2019]. Retrieved from the Internet: URL: <https://tools.ietf.org/pdf/draft-ietf-roll-dao-projection-06.pdf> pp. 1-25.
Winter, "Re: [Roll][ [roll] #26: Establishing downward routes in RPL: storing / non-storing / mixed modes of operation", [online], Apr. 3, 2010, [retrieved on May 31, 2019]. Retrieved from the Internet: URL: <https://www.ietf.org/mail-archive/web/roll/current/msg03562.html>, 2 pages.

(Continued)

*Primary Examiner* — Michael Thier
*Assistant Examiner* — Nevena Zecevic Sandhu
(74) *Attorney, Agent, or Firm* — Leon R. Turkevich

(57) ABSTRACT

A method by a wireless network device in a wireless data network comprises: joining a non-storing mode destination-oriented directed acyclic graph (DODAG) in response to receiving a multicast DODAG information object (DIO) message originated by a root device; generating and transmitting a unicast destination advertisement (DAO) message destined for the root device and indicating the wireless network device has joined the DODAG; advertising as a subroot of a subDAG in the DODAG, based on outputting a second message specifying subDAG information identifying the subDAG; receiving a second unicast DAO message generated by a child network device in the subDAG and addressed to the wireless network device, the second unicast DAO message indicating the child network device has joined the subDAG; and generating and sending a third unicast DAO message to the root device specifying the child network device is reachable via the wireless network device.

20 Claims, 9 Drawing Sheets

(51) Int. Cl.
   *H04L 12/761* (2013.01)
   *H04W 84/18* (2009.01)
   *H04L 45/16* (2022.01)

(56) References Cited

U.S. PATENT DOCUMENTS

| | | | |
|---|---|---|---|
| 7,209,978 | B2 | 4/2007 | Thubert et al. |
| 7,552,234 | B2 | 6/2009 | Thubert et al. |
| 7,668,119 | B2 | 2/2010 | Thubert et al. |
| 7,778,235 | B2 | 8/2010 | Thubert et al. |
| 8,102,775 | B2 | 1/2012 | Thubert |
| 8,630,177 | B2 | 1/2014 | Vasseur et al. |
| 9,344,256 | B2 | 5/2016 | Thubert et al. |
| 9,479,421 | B2 | 10/2016 | Thubert et al. |
| 9,698,864 | B2 | 7/2017 | Shaffer et al. |
| 10,009,256 | B2 | 6/2018 | Thubert et al. |
| 10,320,652 | B2 | 6/2019 | Thubert et al. |
| 2014/0029610 | A1 | 1/2014 | Vasseur et al. |
| 2017/0207967 | A1* | 7/2017 | Thubert ............ H04L 45/22 |
| 2019/0004587 | A1 | 1/2019 | Van Wyk et al. |
| 2019/0081892 | A1 | 3/2019 | Thubert et al. |
| 2019/0288939 | A1* | 9/2019 | Dong ............ H04L 45/021 |
| 2020/0099616 | A1* | 3/2020 | Nguyen ............ H04L 45/72 |

OTHER PUBLICATIONS

Deering et al., "Internet Protocol, Version 6 (IPv6) Specification", Network Working Group, Request for Comments: 2460, Dec. 1998, pp. 1-39.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Hui et al., "An IPv6 Routing Header for Source Routes with the Routing Protocol for Low-Power and Lossy Networks (RPL)", Internet Engineering Task Force (IETF), Request for Comments: 6554, Mar. 2012, pp. 1-13.

Thubert, Ed., et al., "IPv6 over Low-Power Wireless Personal Area Network (6LoWPAN) Routing Header", Internet Engineering Task Force (IETF), Request for Comments: 8138, Apr. 2017, pp. 1-37.

She et al., U.S. Appl. No. 16/353,137, filed Mar. 14, 2019.

* cited by examiner

OVERLAPPING SUBDAGS IN A RPL NETWORK

TECHNICAL FIELD

The present disclosure generally relates to overlapping subDAGs in a RPL network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes toward a single "root" network device in the form of a directed acyclic graph (DAG) toward the root network device, also referred to as a "DAG root", where all routes in the LLN terminate at the DAG root. The DAG also can be referred to as a destination oriented directed acyclic graph (DODAG) rooted at a DODAG root network device.

Downward routes (i.e., away from the DAG root) can be created based on Destination Advertisement Object (DAO) messages that are created by a RPL node and propagated toward the DAG root. The RPL instance implements downward routes in the DAG of the LLN in either a storing mode only (fully stateful), or a non-storing mode only (fully source routed by the DAG root). In storing mode, a RPL node unicasts its DAO message to its parent node, such that RPL nodes store downward routing tables for their "sub-DAG" (the "child" nodes connected to the RPL node). In non-storing mode the RPL nodes do not store downward routing tables, hence a RPL node unicasts its DAO message to the DAG root such that all data packets are sent to the DAG root, requiring the DAG root to recursively build a full source-route path for reaching a destination device identified by a data packet received by the DAG root.

A particular problem in large non-storing RPL networks is that since all data packets are sent to the DAG root, the DAG root can encounter substantial processing burdens in generating a full source-route path for each destination device in the DAG, particularly if the destination device is a leaf network device that requires traversal of a substantially large number of hops (e.g., 10 or more hops); the requirement of a substantially-large source routing header to reach a distant leaf network device (e.g., 10 or more hops) not only substantially burdens transmission requirements due to the substantially-large routing header, but also substantially increases the risk of packet loss between the DAG root and the distant leaf network device. Further, the DAG root is a single point of failure for the LLN, such that a failure of the DAG root can result in total traffic loss in the LLN and substantial delays (e.g., over a month) to rebuild the DAG.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
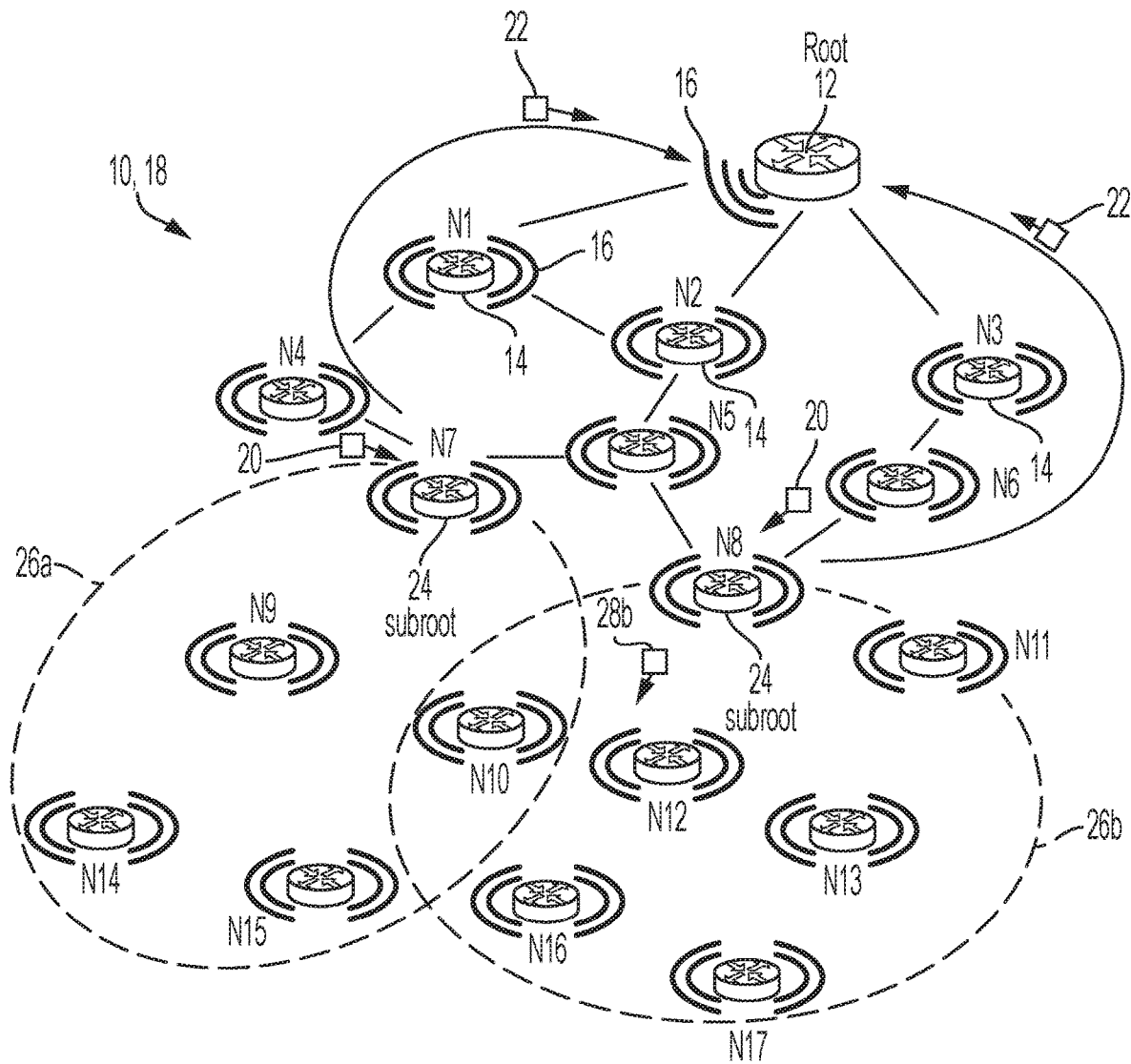
FIGS. 1A-1D illustrates an example system having one or more apparatus advertising as a subroot of a sub-directed acyclic graph (subDAG) within a destination-oriented directed acyclic graph (DODAG) for bypass of a DODAG root network device, according to an example embodiment.

In one embodiment, a method comprises: joining, by a wireless network device in a wireless data network, to a non-storing mode destination-oriented directed acyclic graph (DODAG) in response to receiving a multicast DODAG information object (DIO) message originated by a root network device; generating and transmitting, by the wireless network device, a unicast destination advertisement (DAO) message destined for the root network device and indicating the wireless network device has joined the DODAG; advertising, by the wireless network device, as a subroot of a subDAG in the DODAG, based on generating and outputting a second message specifying subDAG information identifying the subDAG; receiving a second unicast DAO message generated by a child network device in the subDAG and addressed to the wireless network device, the second unicast DAO message indicating the child network device has joined the subDAG; and generating and sending, by the wireless network device, a third unicast DAO message to the root network device specifying the child network device is reachable via the wireless network device.

In another embodiment, an apparatus is implemented as a physical machine. The apparatus comprises non-transitory machine readable media configured for storing executable machine readable code; a device interface circuit configured for receiving a multicast destination-oriented directed acyclic graph (DODAG) information object (DIO) message originated by a root network device in a wireless data network; and a processor circuit. The processor circuit is configured for executing the machine readable code, and when executing the machine readable code operable for: joining, by the apparatus implemented as a wireless network device, to a non-storing DODAG in response to receiving the multicast DIO message; generating a unicast destination advertisement (DAO) message destined for the root network device and indicating the wireless network device has joined the DODAG; advertising as a subroot of a subDAG in the DODAG, based on generating a second message specifying subDAG information identifying the subDAG; receiving a second unicast DAO message generated by a child network device in the subDAG and addressed to the wireless network device, the second unicast DAO message indicating the child network device has joined the subDAG; and generating and outputting a third unicast DAO message to the root network device specifying the child network device is reachable via the wireless network device.

In another embodiment, one or more non-transitory tangible media is encoded with logic for execution by a machine and when executed by the machine operable for: joining, by the machine implemented as a wireless network device in a wireless data network, to a non-storing mode destination-oriented directed acyclic graph (DODAG) in response to receiving a multicast DODAG information object (DIO) message originated by a root network device; generating and transmitting, by the wireless network device, a unicast destination advertisement (DAO) message destined for the root network device and indicating the wireless network device has joined the DODAG; advertising, by the wireless network device, as a subroot of a subDAG in the DODAG, based on generating and outputting a second message specifying subDAG information identifying the subDAG; receiving a second unicast DAO message generated by a child network device in the subDAG and addressed to the wireless network device, the second unicast DAO message indicating the child network device has joined the subDAG; and generating and sending, by the wireless network device, a third unicast DAO message to the root network device specifying the child network device is reachable via the wireless network device.

In another embodiment, a method comprises: first receiving, by a wireless network device in a wireless data network, a first destination-oriented directed acyclic graph (DODAG) information object (DIO) message multicast transmitted by a first parent network device advertising as a corresponding subroot for a first subDAG in a non-storing mode DODAG generated by a root network device; first registering, by the wireless network device, with the first parent network device as a corresponding child within the first subDAG based on generating and unicast transmitting, to the first parent network device, a first destination advertisement object (DAO) message; second receiving, by the wireless network device, a second DIO message multicast transmitted by a second parent network device advertising as a corresponding subroot for a second subDAG in the DODAG; and second registering, by the wireless network device, with the second parent network device as a corresponding child within the second subDAG based on generating and unicast transmitting, to the second parent network device, a second DAO message, the first registering and second registering causing concurrent overlapping membership of the wireless network device in the first and second subDAGs in the DODAG.

In another embodiment, one or more non-transitory tangible media is encoded with logic for execution by a machine and when executed by the machine operable for: first receiving, by the machine implemented as a wireless network device in a wireless data network, a first destination-oriented directed acyclic graph (DODAG) information object (DIO) message multicast transmitted by a first parent network device advertising as a corresponding subroot for a first subDAG in a non-storing mode DODAG generated by a root network device; first registering, by the wireless network device, with the first parent network device as a corresponding child within the first subDAG based on generating and unicast transmitting, to the first parent network device, a first destination advertisement object (DAO) message; second receiving, by the wireless network device, a second DIO message multicast transmitted by a second parent network device advertising as a corresponding subroot for a second subDAG in the DODAG; and second registering, by the wireless network device, with the second parent network device as a corresponding child within the second subDAG based on generating and unicast transmitting, to the second parent network device, a second DAO message, the first registering and second registering causing concurrent overlapping membership of the wireless network device in the first and second subDAGs in the DODAG.

In another embodiment, one or more non-transitory tangible media is encoded with logic for execution by a machine and when executed by the machine operable for: multicast transmitting, by the machine implemented as a root network device in a wireless data network, a destination-oriented directed acyclic graph (DODAG) information object (DIO) message identifying a non-storing mode DODAG formed by the root network device; first registering, by the root network device, a first subroot device of a first subDAG in response to receiving a first destination advertisement object (DAO) message specifying reachability by the first subroot device to first subDAG child network device in the first subDAG; second registering, by the root network device, a second subroot device of a second subDAG in response to receiving a second DAO message specifying reachability by the second subroot device to second subDAG child network devices in the second subDAG; and forwarding a packet to one of the subDAG child network devices based on generating a truncated source-route path to the corresponding subroot device.

DETAILED DESCRIPTION

Particular embodiments enable one or more wireless network devices, in a low power and lossy network (LLN), to respond to joining a non-storing mode destination-oriented directed acyclic graph (DODAG) by advertising as a subroot of a sub-directed acyclic graph (subDAG) in the DODAG, based on outputting an advertisement message that includes subDAG information identifying the subDAG. A subroot can receive a unicast DAO message generated by a child network device in the subDAG and addressed to the subroot, where the unicast DAO message indicates that the child network device has joined the subDAG. Hence, the subroot can store information for reaching the child network device within the subDAG, and generate and send, to the DODAG root network device, a modified unicast DAO message specifying that that the child network device (within the subDAG) is reachable via the subroot.

FIGS. 1A-1D illustrates an example wireless mesh data network 10, for example an IEEE 802.15.4e/g based low powered and lossy network (LLN), according to an example embodiment. The wireless mesh data network 10 can be implemented as a personal area network (PAN) or a field area network (FAN), for example, as an IEEE 802.15.4e/g based connected grid mesh (CG-mesh) network advanced metering infrastructure (AMI). The example wireless mesh data network (e.g., a CG-mesh network) 10 comprises a root mesh network device 12 configured for operating as a destination-oriented directed acyclic graph (DODAG) root for multiple wireless mesh network devices (e.g., "N1" through "N17") 14 via wireless data links 16, according to an example embodiment. The root network device 12 can be implemented, for example, as a commercially-available Cisco® 1000 Series Connected Grid Router (CGR) from Cisco Systems, San Jose, Calif., that is modified as described herein; hence, the root mesh network device 12 also is referred to as a CGR 12, a DAG root 12, a DODAG root 12, or a root network device "CGR" 12. The root network device 12 can establish a DODAG 18 based on outputting multicast DODAG information object (DIO) messages 20, for example according to the Internet Engineering Task Force (IETF) Request for Comments (RFC) 6550.

Each wireless RPL network device 14 in the wireless mesh data network 10 can join the DODAG 18 via wireless data links 16 in response to receiving a multicast DIO message 20. Each wireless mesh network device 14 can be implemented as a constrained network device, or "LLN device" or "CG-mesh" device, configured for operating for example as a RPL node according to the Internet Engineering Task Force (IETF) Request for Comments (RFC) 6550. Hence, each wireless mesh network device 14 can establish a DODAG topology 18 overlying the wireless mesh data network 10, described below, that is rooted at the root network device 12.

The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a wireless mesh network device 14 also can be referred to herein as a "RPL node" or a wireless network device. Each RPL node 14 in the LLN typically is constrained by processing power, memory, and energy (e.g., battery power); interconnecting wireless data links 16 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device 12 in the form of a directed acyclic graph (DAG) 18 toward the root network device 12, where all routes in the LLN terminate at the root network device 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., node "N17" or beyond).

Each "child" network device (e.g., "N1") 14 detecting the multicast DIO message 20 output by the root network device 12 can select the root network device 12 as a parent in the identified DODAG 18 based on comparing network topology metrics (advertised in the multicast DIO message 20) to a prescribed objective function of the RPL instance. The "child" network device (e.g., "N1") 14, upon attaching to its parent, can output its own updated multicast DIO message 20 with updated network topology metrics (e.g., rank identifier) that enable other wireless mesh network devices 14 to discover the DODAG 18, learn the updated network topology metrics, and select a DODAG parent. Hence, the network devices "N1" through "N8" 14 can join the DODAG 18 in response to receiving a multicast DIO message 20 from an advertising DODAG parent device, and selecting the DODAG parent as a default route. As illustrated in FIG. 1A, the mesh network device "N4" 14 can receive an updated multicast DIO message 20 from "N1"; and the mesh network device "N7" 14 can receive an updated multicast DIO message 20 from the mesh network device "N4" 14 and/or "N5" (having received a DIO message 20 from "N2"); similarly, the mesh network device "N6" 14 can receive an updated multicast DIO message 20 from "N3" 14, and "N8" 14 can receive an updated multicast DIO message 20 from "N6" 14 and/or "N5".

Downward routes (i.e., away from the DAG root) can be created based on unicast Destination Advertisement Object (DAO) messages 22 that are created by a wireless mesh network device 14 and unicast transmitted to the DAG root 12. In non-storing mode the RPL nodes do not store downward routing tables, hence a RPL node 14 unicasts its DAO message 22 to the DAG root 12, such that all data packets are sent to the DAG root and routed downward with source routes inserted by the DAG root 12. As illustrated in FIG. 1A, the wireless network device "N7" can generate and transmit to the root network device 12 a unicast DAO message 22 that is propagated via the default parent devices "N4" and "N1" to the root network device 12; the wireless network device "N8" can generate and transmit to the root network device 12 a unicast DAO message 22 that is propagated via the default parent devices "N6" and "N3" to the root network device 12.

Figure 2:
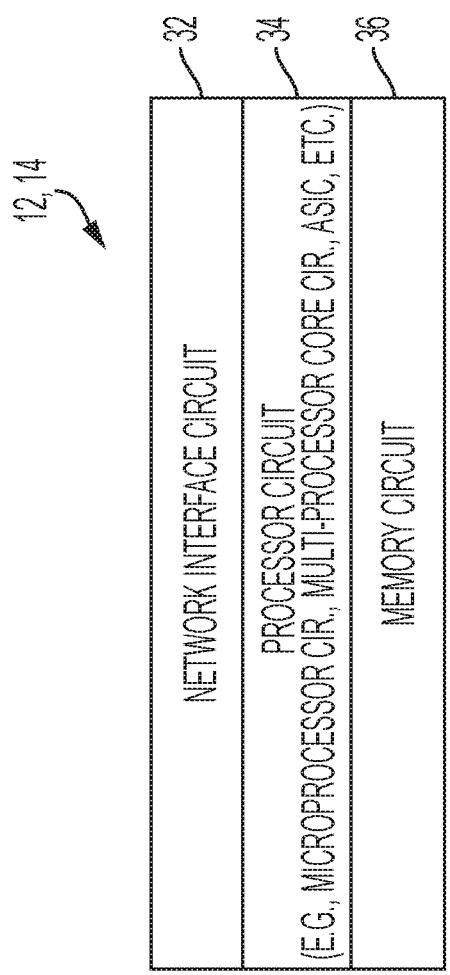
FIG. 2 illustrates an example implementation of any one of the network devices of FIGS. 1A-1D, according to an example embodiment.

The DAG root 12, in response to receiving the DAO messages from the RPL nodes 14, can build the entire nonstoring DODAG topology 18 in accordance with RFC 6550, and store the DAG topology in its memory circuit 34 (illustrated in FIG. 2).

As described in further detail below, the wireless mesh data network 10 can include wireless network devices (e.g., "N7", "N8") having sufficient processing capacity as "fog nodes" (e.g., power, memory, processor capacity) to operate as a subroot 24 for a subDAG 26 in the DODAG 18; these "fog nodes" "N7", "N8" 14 can be implemented, for example, using commercially-available Cisco 500 Series WPAN Industrial Routers from Cisco Systems, modified as described herein.

Hence, a wireless network device (e.g., "N7", "N8") can respond to joining a non-storing mode DODAG 18 by advertising as a subroot 24 of a subDAG 26 in the DODAG 18, based on outputting a multicast advertisement message 28 (e.g., a modified multicast DIO message 28) that includes subDAG information (30 of FIG. 4) identifying and describing the subDAG 26. As described below with respect to FIG. 1B, each subroot 24 can receive a unicast DAO message 22 generated by a child network device 14 and indicating the child network device has joined the subDAG 26. Each subroot 24 can respond to receiving a unicast DAO message 22 by generating and outputting to the root network device 12 a modified unicast DAO message 22' indicating that a child network device in its subDAG 26 is reachable via the subroot 24. Hence, the subroot "N7" 24 can output one or more modified unicast DAO messages 22'$a$ indicating any one or more of its child network devices "N9", "N10", "N14", and/or "N15" 14 is reachable via the subroot "N7" 24; the subroot "N8" 24 can output one or more modified unicast DAO messages 22'$b$ indicating any one or more of its child network devices "N10", "N11", "N12", "N13", "N16", and/or "N17" 14 is reachable via the subroot "N8" 24.

The example embodiments also enable a child network device (e.g., "N10") to selectively join one or more subDAGs 26$a$, 26$b$ based on unicast transmitting respective DAO messages 22$a$, 22$b$ to the associated subroots "N7" and "N8" 24, for example based on objective function metrics associated with the subDAGs 26, resulting in concurrent overlapping membership of the subDAG child device "N10" 14 in the subDAGs.

Hence, example embodiments enable deployment of one or more subDAGs 26 by respective subroots 24 within a non-storing mode DODAG 18, enabling each subroot 24 to hide its subDAG topology from the DODAG root network device 12; the use of subroots 24 to generate subDAGs 26 can reduce the size of source-route paths from the DODAG root network device 12 to a corresponding subroot 24, enabling generation of a truncated source-route path as opposed to requiring the complete source-route to a leaf network device (e.g., "N17"), since a subroot (e.g., "N8") 24 has reachability information for reaching a leaf network device in its subDAG 26b based on a received unicast DAO message 22c from the leaf network device. Moreover, the example embodiments can minimize source-routing by the DODAG root network device 12 based on a subroot 24 limiting intra-subDAG communications to within the subDAG; moreover, a subroot 24 can send an instruction to a network device for directing network traffic, destined for a child network device in its subDAG 26, toward the subroot 24 and/or another child network device (e.g., "N10") in the subDAG. Hence, the example embodiments enable one or more subroots 24 to direct network traffic between respective non-storing mode subDAGs 26, for example via a child network device (e.g., "N10") having overlapping membership, or a common parent (e.g., "N5") of the subroots 24.

Hence, the example embodiment enables deployment of subDAGs 26 in a non-storing DODAG topology, enabling communications that bypass the DODAG root 12.

Although only the network devices "N1", "N2", and "N3" are labeled with the reference numeral "14" to avoid cluttering in the Figures, it should be apparent that all the network devices "N1" through "N17" are allocated the reference numeral "14" for purposes of the description herein. Further, it should be apparent that all the network devices "N1" through "N17" 12 are configured for establishing wireless data links 16 (illustrated as curved lines radiating from each device 12 or 14), even though only the wireless data links for the network device "N1" 12 and the root network device 14 are labeled with the reference numeral "16" to avoid cluttering in the Figures.

Although only a subset of the devices 14 in the Figures are illustrated as outputting a multicast DIO message 20 and/or a unicast DAO message 22, etc. to avoid cluttering in the Figures, it should be apparent that all the network devices "N1" through "N17" 14 and the root network device 12 can output a corresponding multicast DIO message 20 as described herein, and each of the network devices "N1" through "N17" can output a unicast DAO message 22 as described herein. Further, it should be apparent that all the network devices "N1" through "N17" 12 can have one or more attachments to a parent network device, where each attachment establishes a next-hop path chosen for an identifiable objective function.

FIG. 2 illustrates an example implementation of any one of the devices 12, 14 of FIGS. 1A-1D, according to an example embodiment.

Each apparatus 12, 14 can include a device interface circuit 32, a processor circuit 34, and a memory circuit 36. The device interface circuit 32 can include one or more distinct physical layer transceivers for communication with any one of the other devices 12, 14; the device interface circuit 32 also can include an IEEE based Ethernet transceiver for communications with the devices of FIG. 1 via any type of data link (e.g., a wired or wireless link, an optical link, etc.). The processor circuit 34 can be configured for executing any of the operations described herein, and the memory circuit 36 can be configured for storing any data or data packets as described herein.

Any of the disclosed circuits of the devices 12, 14 (including the device interface circuit 32, the processor circuit 34, the memory circuit 36, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 36) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 36 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 36 can be implemented dynamically by the processor circuit 34, for example based on memory address assignment and partitioning executed by the processor circuit 34.

Figure 3A:
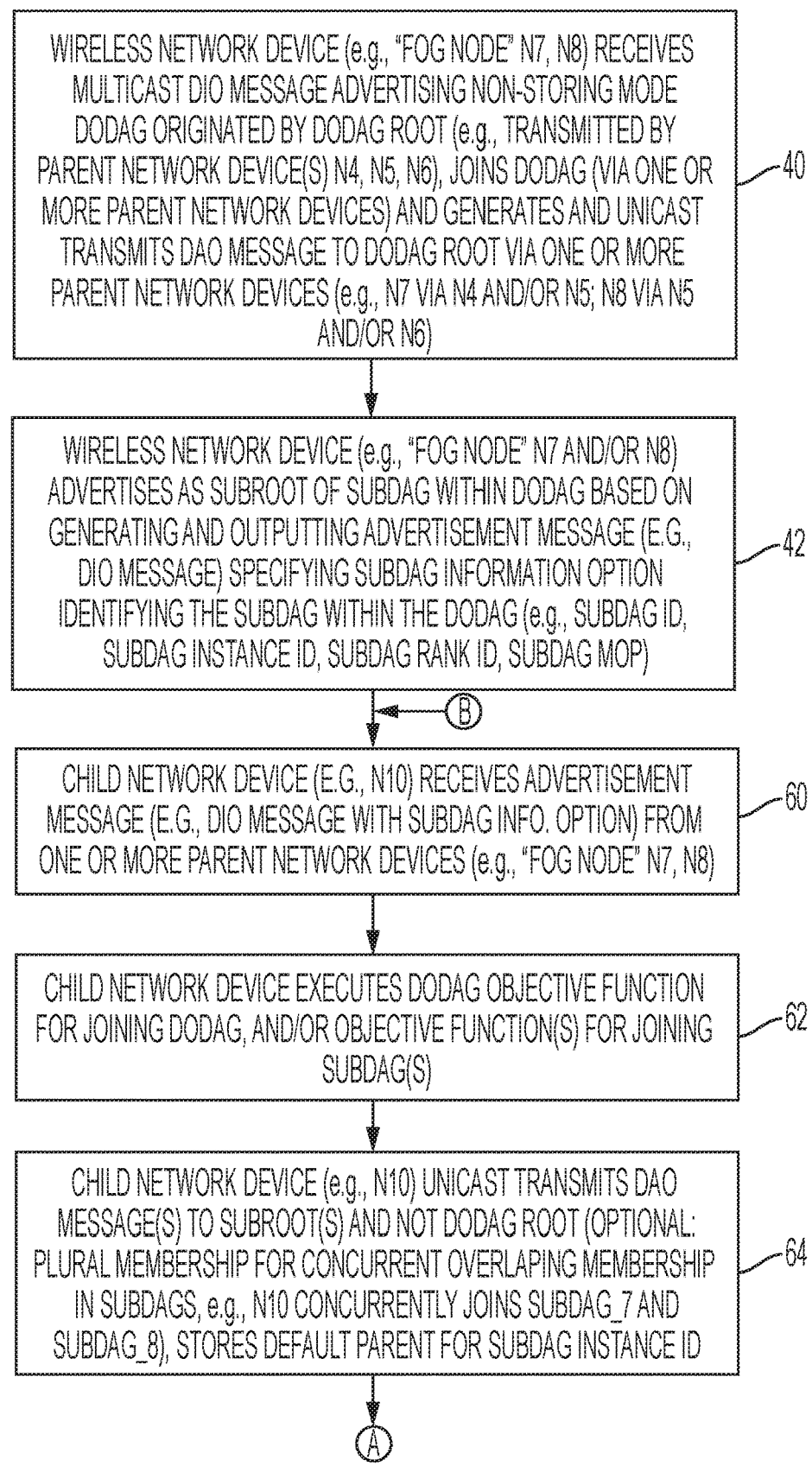
FIGS. 3A-3C illustrate an example method of one or more subroots deploying a subDAG within a DODAG, for bypass of a DODAG root network device, according to an example embodiment.
Figure 3B:
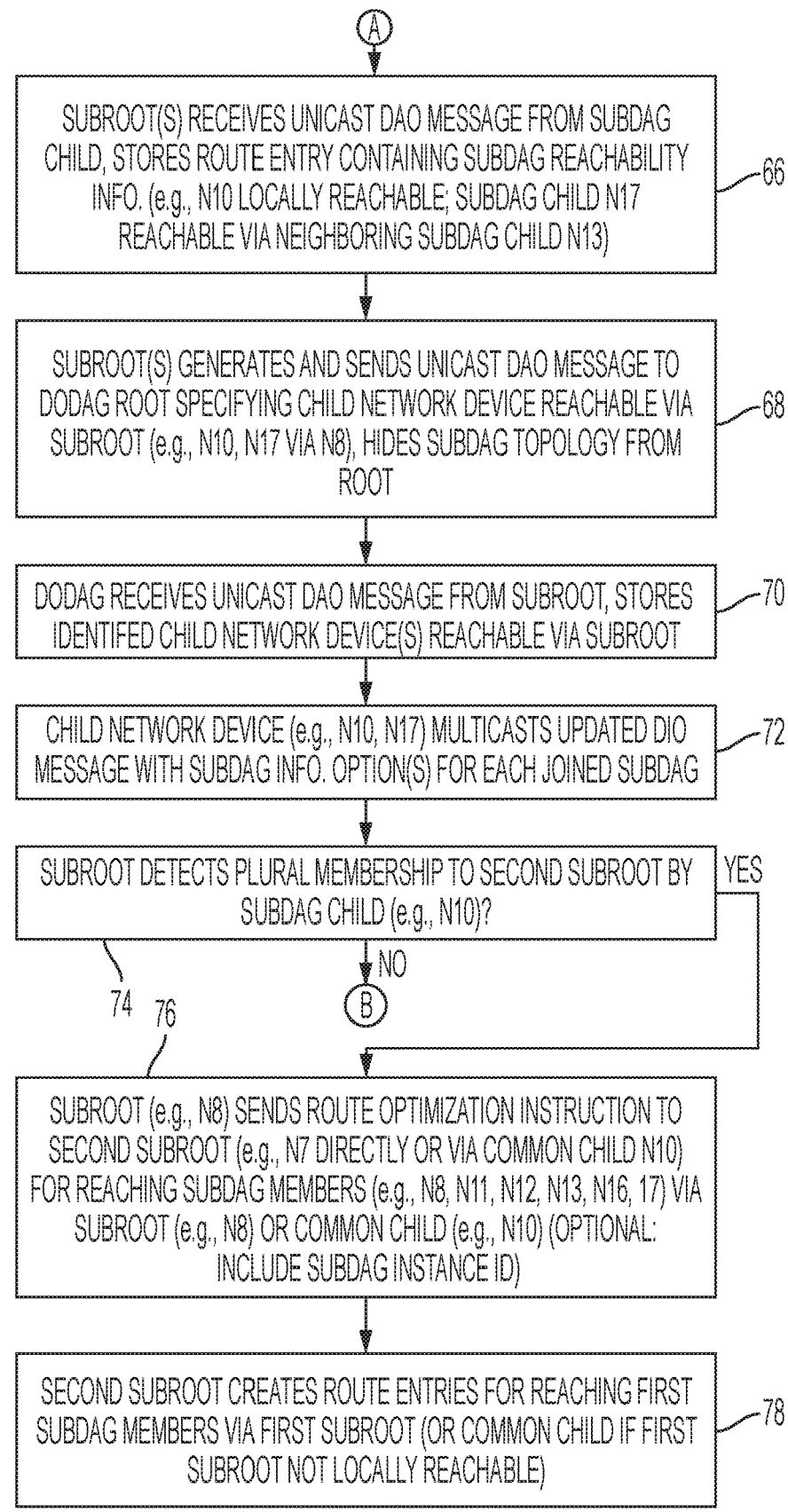
Figure 3C:
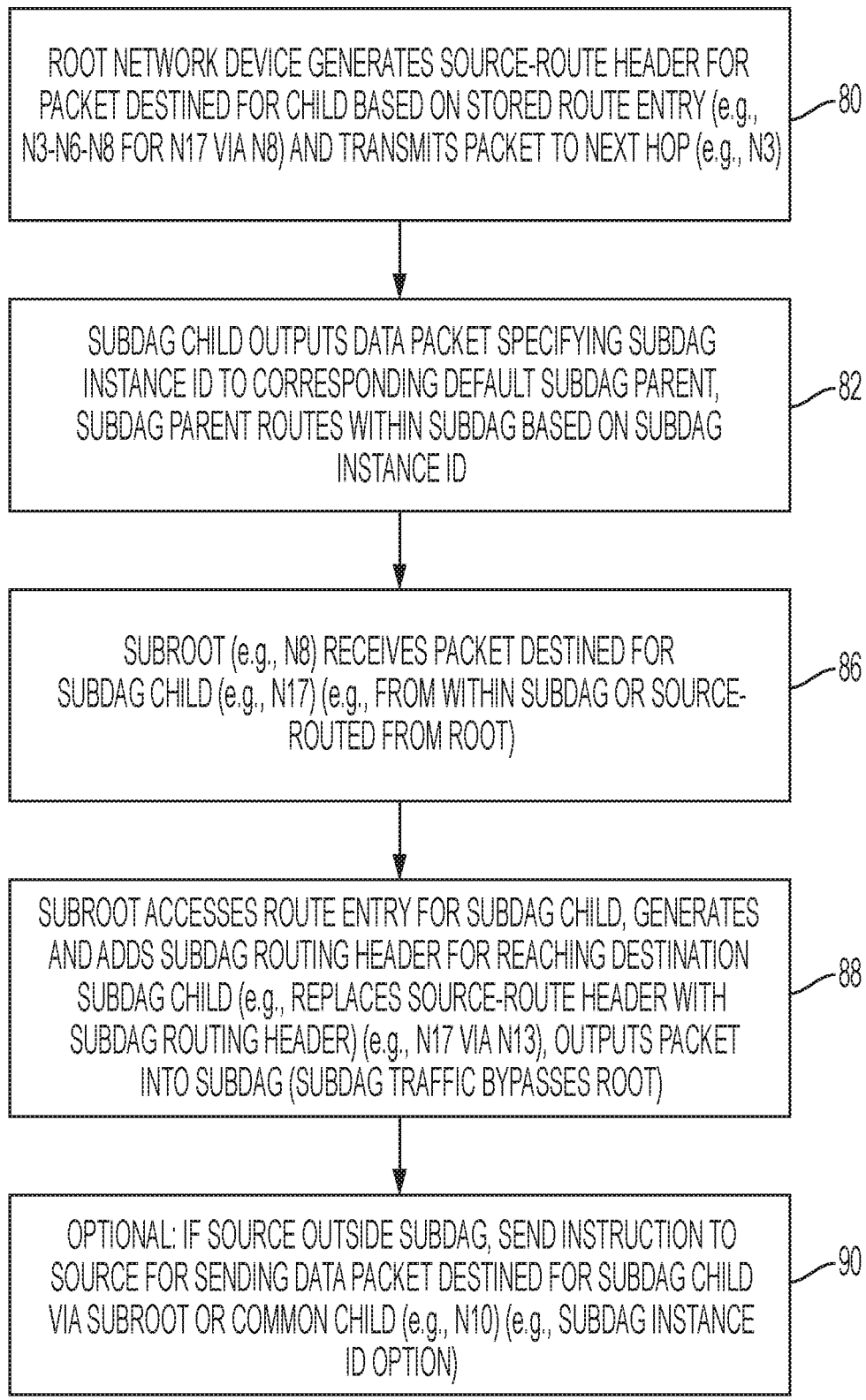

FIGS. 3A-3C illustrate an example method of one or more subroots deploying a subDAG within a DODAG, for bypass of a DODAG root network device, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the device interface circuit 32 of each wireless network device 14, for example the "fog" network devices "N7" and "N8" 14, can receive in operation 40 a multicast DIO message 20 transmitted by one or more neighboring network devices 14. For example, the "fog" network device "N7" 14 can receive a multicast DIO message 20 from "N4" and/or "N5" 14, and the "fog" network device "N8" 14 can receive a multicast DIO message 20 from "N5" and/or "N6". Each multicast DIO message 20 is originated by the root network device 12 and each multicast DIO message 20 specifies a non-storing mode topology for the DODAG 18.

In response to receiving the multicast DIO message 20, the processor circuit 34 of each "fog" network device (e.g., "N7", "N8") in operation 40 can join the DODAG 18 and unicast transmit a corresponding unicast DAO message 22, according to RFC 6550. For example, processor circuit 34 of the "fog" network device "N7" can store in its memory circuit 36 a default route entry specifying the wireless network device "N4" 14 as its default parent, and generate and output in operation 40 a unicast DAO message 22 to the root network device 12 via the network devices "N4" and "N1". The processor circuit 34 of the "fog" network device "N7" can store in its memory circuit 36 the network device "N5" as an alternate parent device and send a corresponding DAO message 22. Similarly, the processor circuit 34 of the "fog" network device "N8" can store in its memory circuit 36 a default route entry specifying the wireless network device "N6" 14 as its default parent, and generate and output in operation 40 a unicast DAO message 22 to the root network device 12 via the network devices "N6" and "N3"; the processor circuit 34 of the "fog" network device "N8" can store in its memory circuit 36 the network device "N5" as an alternate parent device and send a corresponding DAO message 22.

Each DAO message 22 output by the network device "N7" and/or "N8" also can specify an indicator that the corresponding network device "N7" and/or "N8" is registering in the DODAG 18 as a corresponding subroot 24 for a subDAG 26, enabling the root network device 12 to identify the network devices "N7" and "N8" as subroots 24 for subDAG optimizations, described below.

The root network device 12 can respond to each of the unicast DAO messages 22 from the child network devices based on storing route entries for reaching each of the child network devices having unicast transmitted a corresponding unicast DAO message 22, including the child network devices "N7" and "N8", including storing in the route entries the respective identifiers identifying the child network devices "N7" and "N8" as subroots 24 (e.g., for "sub-DAG_7" 26a and "subDAG_8" 26b, respectively). The root network device 12 can recursively build source route headers for reaching each of the child network devices based on the stored route entries. For example, the root network device 12 can recursively access its route entries for child network devices "N1", "N4", and "N7" (and/or "N2", "N5", and "N7") to generate a source-route path for reaching the subroot network device "N7" 24 via the source-route path "N1-N4-N7" (or "N2-N5-N7"; the root network device 12 also can recursively access its route entries for child network devices "N3", "N6", and "N8" (and/or "N7", "N5", and "N8") to generate a source-route path for reaching the subroot network device "N8" 24 via the source-route path "N3-N6-N8" (or "N2-N5-N8"). The root network device 12 can determine, based on the DAO messages 22 specifying that devices "N7" and "N8" are subroots, that the subroot network devices "N7" and "N8" 24 share a common parent "N5" for purposes of route optimization, described below.

The processor circuit 34 of each "fog" network device "N7" and/or "N8" 14 in operation 42 can be configured for advertising as a subroot 24 of a corresponding subDAG 26 within the DODAG 18, based on generating and outputting a corresponding modified multicast DIO message 28 that specifies a corresponding subDAG information 30 identifying and describing the corresponding subDAG 26.

Figure 4:
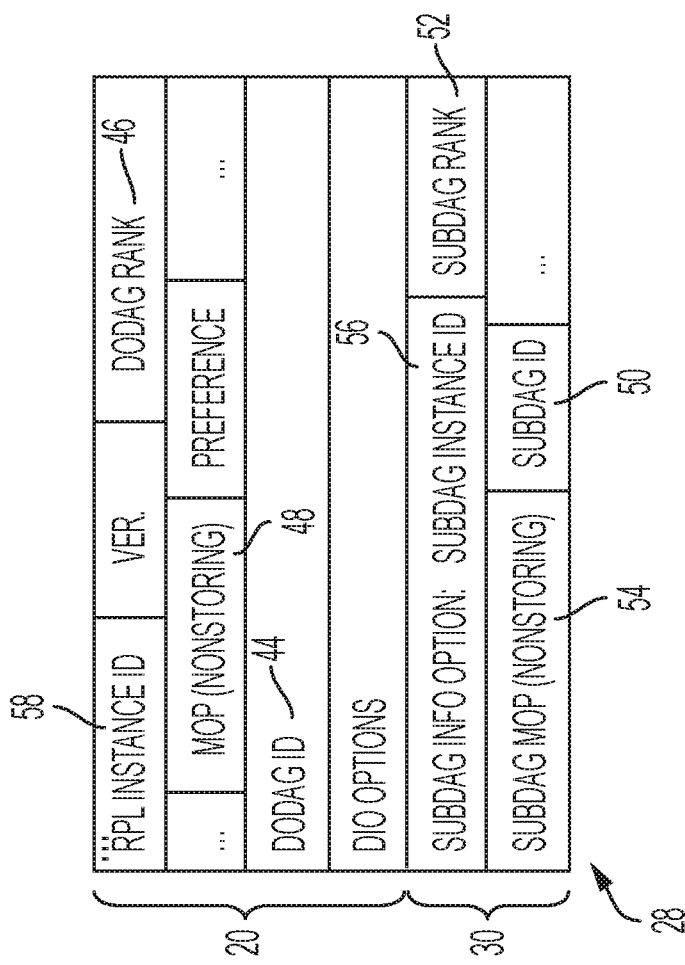
FIG. 4 illustrates an example DODAG information object (DIO) message comprising subDAG information identifying a subDAG, according to an example embodiment.

FIG. 4 illustrates an example modified multicast DIO message 28 generated and output by a wireless RPL network device 14 operating as a subroot (e.g., "N7" and/or "N8") 24, according to an example embodiment. The modified multicast DIO message 28 can include updated parameters for the multicast DIO message 20, in accordance with RFC 6550, including a DODAG identifier 44 that identifies the DODAG 18 generated by the root network device 12, a DODAG rank 46 that identifies the corresponding rank of the advertising device (e.g., subroot 24) in the DODAG 18, in accordance with RFC 6550, and a mode of operation (MOP) 48 that specifies the DODAG 18 is operating in nonstoring mode. The modified multicast DIO message 28 generated by a wireless RPL network device 14 operating as a subroot (e.g., "N7" and/or "N8") 24 also can specify in the subDAG information 30 a subDAG identifier 50 (e.g., an IPv6 address of the subroot 24) that is distinct from the DODAG identifier 44, a subDAG rank 52, and a subDAG mode of operation (MOP) identifier 54 specifying nonstoring mode only operation. The subDAG rank 52 is distinct from the DODAG rank 46, and the subDAG rank 52 identifies a corresponding rank of the transmitting network device (e.g., the subroot "N7" or "N8") in the corresponding subDAG 26; hence, the subDAG rank 52 is distinct from the DODAG rank 46, such that the subDAG rank 52 identifies the relative rank of a transmitting network device that is transmitting the modified multicast DIO message 28 (as described below, the subDAG rank 52 can be updated to a successively higher value by subDAG child network devices).

The subDAG information 30 also can include a subDAG instance identifier 56 that is distinct from the RPL instance identifier 58 in the multicast DIO message 20, where the RPL instance identifier 58 is set by the root network device 12 during initial generation of the multicast DIO message 20. As described below, the subDAG instance identifier 56 is associated with the corresponding subDAG 26 as a local instance of the subDAG in the DODAG 18, such that the subDAG instance identifier 56 can cause child network devices in the subDAG 26 to use the subDAG instance identifier 56 for routing data packets within the subDAG 26.

Hence, the subroot "N7" 24 in operation 42 can establish the subDAG "subDAG_7" 26a based on outputting the modified multicast DIO message 28a, and the subroot "N8"

24 in operation 42 can establish the subDAG "subDAG_8" 26b based on outputting the modified multicast DIO message 28b.

The device interface circuit 32 of a neighboring wireless network device (e.g., "N10") 14 in operation 60 can receive any one of the modified multicast DIO message 28a of FIG. 1A, and/or the modified multicast DIO message 28b from the subroot "N7" 24 and/or the subroot "N8" 24, respectively. In response to receiving a modified multicast DIO message 28, the processor circuit 34 of the wireless network device (e.g., "N10" 14) in operation 62 can execute an objective function for joining the DODAG 18 per RFC 6550; alternately, the processor circuit 34 of the wireless network device (e.g., "N10" 14) in operation 62 can respond to the subDAG information 30 in a received modified multicast DIO message 28 based on executing an objective function for joining the corresponding subDAG 26. The objective functions executed for joining any one of the subDAGs 26 can be independent and distinct from any objective function specified by the root network device 12 for joining the DODAG 18.

Hence, the processor circuit 34 of the neighboring wireless network device (e.g., "N10") 14 in operation 64 can join each subDAG 26a, 26b, based on storing (in its memory circuit 36) the route entries for the subDAG "subDAG_7" 26a (via the locally-reachable subroot "N7" 24), and for the subDAG "subDAG_8" 26b (via the locally-reachable subroot "N8" 24); the processor circuit 34 of the child network device "N10" 14 also can store in the route entries the associated subDAG information 30, including the corresponding subDAG identifier 50 and subDAG instance identifier 56 for each subDAG 26. The processor circuit 34 of the neighboring wireless network device (e.g., "N10") 14 in operation 64 also can generate and unicast transmit a corresponding unicast DAO message 22 to each of the subroots 24: the wireless network device "N10" 14 in operation 64 can register as a child of the subDAG 26a with the parent network device "N7", advertising as a subroot 24 for the subDAG 26a, based on transmitting a unicast DAO message 22a of FIG. 1B to the subroot "N7" 24; the wireless network device "N10" 14 in operation 64 also can concurrently register as a child of the subDAG 26b with the parent network device "N8", advertising as a subroot 24 for the subDAG 26b, based on transmitting a corresponding unicast DAO message 22b to the subroot "N8" 24.

Referring to FIG. 3B, the subroots "N7" and "N8" 24 in operation 66 can respond to receiving the unicast DAO message 22a and unicast DAO message 22b by creating route entries specifying the subDAG child network device "N10" is locally reachable within the subDAGs 26a and 26b, respectively. Hence, the wireless network device "N10" can cause concurrent overlapping of the subDAGs "subDAG_7" 26a and "subDAG_8" 26b based on concurrent overlapping membership in both of the subDAGs 26a and 26b, enabling localized routing of network traffic between the subDAGs 26a and 26b that bypasses the root network device 12.

Figure 1B:
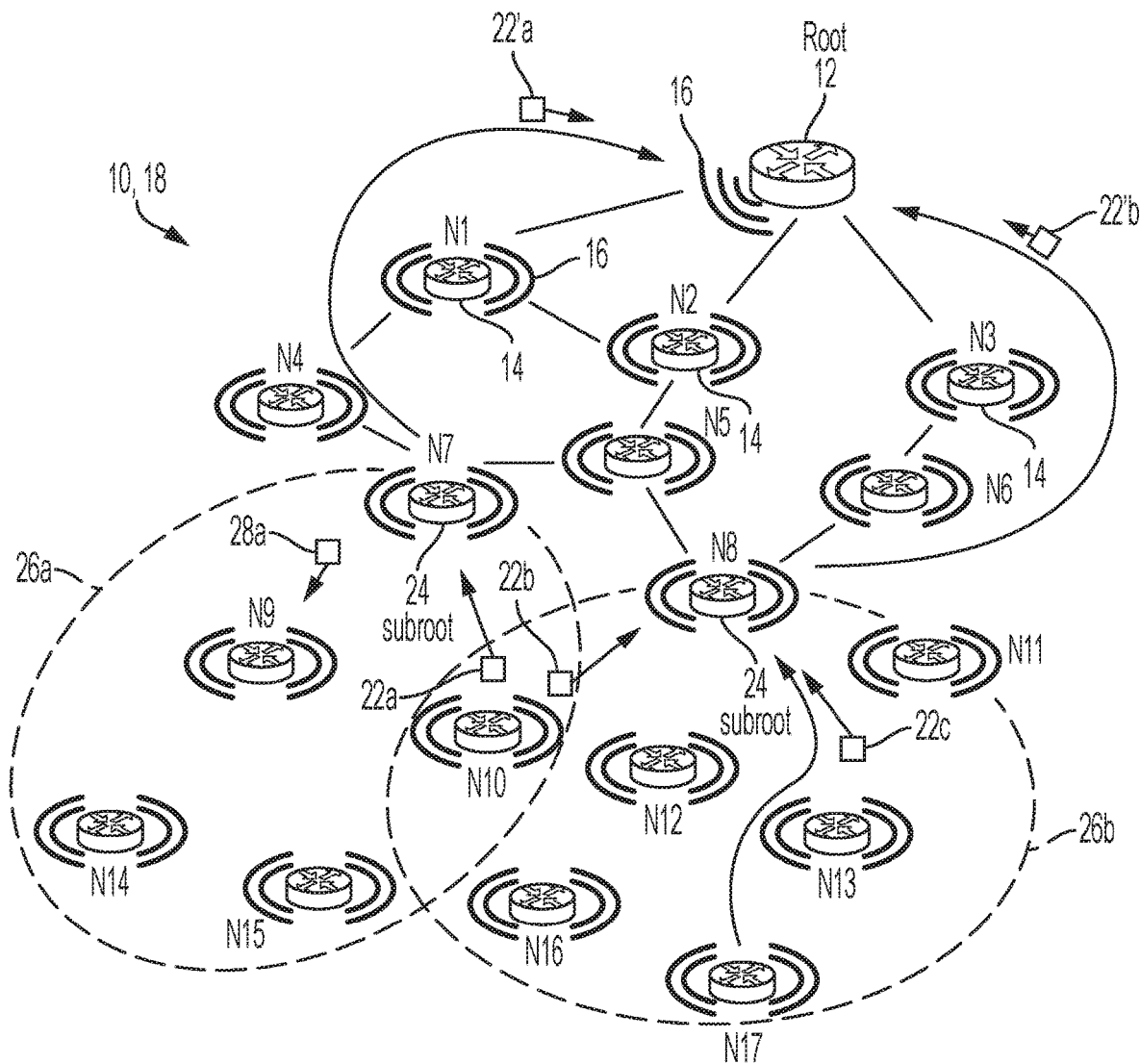

As illustrated in FIG. 1B, the processor circuit 34 of the subroot "N8" also can respond to receiving the unicast DAO message 22c generated by the wireless network device "N17" (and forwarded via the next-hop parent "N13" 14 in the subDAG 26b) based on creating a route entry specifying the subDAG child device "N17" is reachable via the locally-reachable subDAG child "N13".

The processor circuit 34 of the subroots "N7" and "N8" 24 in operation 68 of FIG. 3B also can generate and output a modified unicast DAO message 22'a and modified unicast DAO message 22'b specifying subDAG child network devices that are reachable via the subroots "N7" and "N8" 24, respectively. Hence, the subroot "N7" 24 can generate and output in operation 68 one or more modified unicast DAO messages 22'a indicating any one or more of its child network devices "N9", "N10", "N14", and/or "N15" 14 is reachable via the subroot "N7" 24. The subroot "N8" 24 in operation 68 can generate and output one or more modified unicast DAO messages 22'b indicating any one or more of its child network devices "N10", "N11", "N12", "N13", "N16", and/or "N17" 14 is reachable via the subroot "N8" 24.

Hence, the modified unicast DAO messages 22' enable the subroots "N7" and "N8" 24 to hide the topologies of the subDAGs 26a and 26b, as the root network device 12 in operation 70 can store route entries specifying that a specified subDAG child (e.g., "N17") is reachable by a specified subroot (e.g., "N8"). In the case of the child network device "N10" that is concurrently a subDAG child for the overlapping subDAGs 26a and 26b, the root network device 12 can respond to the modified unicast DAO message 22'a by storing the route entry specifying the network device "N10" is reachable via the network device "N7", and root network device 12 can respond to the modified unicast DAO message 22'b in operation 70 by updating the route entry to specify that the network device "N10" is also reachable via the network device "N8", in accordance with RFC 6550.

The root network device 12 can update the route entries for the subroots "N7" and "N8" to specify that the subroots "N7" and "N8" (and the associated subDAGs 26a and 26b) share the common subDAG child "N10", based on the modified DAO messages 22'a and 22'b. As described in further detail below, the root network device 12 can identify the common subDAG child "N10" for route optimization between the subDAGs 26a and 26b.

Each subDAG child network device (e.g., "N10", "N17") in operation 72 can respond to joining a subDAG 26 by generating and outputting an updated modified multicast DIO message 28 that specifies an updated subDAG rank 52 in the subDAG information 30, and optionally an updated DODAG rank 46 (alternately, the child network device may inherit the DODAG rank 46 of the subroot 24, as appropriate). Hence, the updated modified multicast DIO message 28 enables other neighboring network devices 14 to join a subDAG 26 as described above. Since the common subDAG child network device "N10" has joined both the subDAG 26a and the subDAG 26b, the common subDAG child network device "N10" can output an updated modified multicast DIO message 28 that includes a subDAG information 30 for the subDAG 26a and another subDAG information 30 for the subDAG 26b in the same modified multicast DIO message 28, with the associated updated subDAG rank 52. If appropriate, the common subDAG child "N10" also can be configured to operate as a subroot and generate its own subDAG.

Each subroot 24 in operation 74 also can proactively optimize communications between overlapping subDAGs 26 based on detecting, within a unicast DAO message 22 output by a child network device (e.g., "N10"), an identifier of an overlapping membership (i.e., plural membership) added to the unicast DAO message 22 by the child network device. In one embodiment, the overlapping membership can be based on the common subDAG child "N10" having appended the subDAG information 30 for the subDAG 26b to the unicast DAO message 22a, and having appended the subDAG information 30 for the subDAG 26a to the unicast DAO message 22b. Hence, the processor circuit 34 of the subroot "N8" in operation 74 can detect in the unicast DAO message 22b an identifier that the child network device "N10" also is a member of the subDAG 26a rooted by the subroot "N7" 24 (and/or the processor circuit 34 of the subroot "N7" can detect in the unicast DAO message 22a a corresponding identifier that the child network device "N10" also is a member of the subDAG 26b rooted by the subroot "N8" 24). The identifier indicating overlapping membership of the common subDAG child "N10" can specify any one of the subDAG identifier 50 and/or the subDAG instance identifier 56 of the neighboring subDAG 26.

Hence, the processor circuit 34 of a subroot (e.g., "N8") 24 in operation 76 can send a route optimization instruction for creating a path between the subDAGs 26a and 26b (e.g., via the overlapping subDAG child network device "N10") that bypasses the root network device 12. For example, if the network devices "N7" and "N8" are neighboring network devices, the processor circuit 34 of the subroot "N8" 24 in operation 76 can send to the subroot "N7" 24 (and optionally the common subDAG child "N10") a route optimization instruction that its child network devices "N10", "N11", "N12", "N13", "N16" and/or "N17" in the subDAG 26b are reachable via "N8" (and/or reachable via "N10"); the processor circuit 34 of the subroot "N7" 24 in operation 76 can send to the subroot "N8" a route optimization instruction that its subDAG child network devices "N9", "N10", "N14", and/or "N15" in the subDAG 26a are reachable via "N7" (and/or reachable via "N10"). The route optimization instructions also can specify the subDAG instance identifier 56.

If the network devices "N7" and "N8" are not neighboring network devices, each subroot 24 in operation 76 can send the route optimization instruction (including the corresponding subDAG identifier 50 and/or subDAG instance identifier 56) to the peer subroot via the common subDAG child "N10"; the common subDAG child "N10" also can receive the route optimization instructions for local installation of the reachability to the child subDAG devices in each of the subDAGs 26a and 26b. Hence, the peer subroot "N7" 24 in operation 78 can create one or more route entries for reaching the first subDAG members in the subDAG 26 via the subroot "N8" (if locally reachable), or via the common subDAG child "N10" based on inserting into a data packet a source route entry (e.g., "N7-N10-N8-N17") for a data packet from the subroot "N7" to the destination "N17"; alternately, the subroot "N7" can forward to the common subDAG child "N10" a data packet that specifies the corresponding subDAG instance identifier 56 of the subDAG 26b, causing the common child "N10 to respond to the packet containing the subDAG instance identifier 56 of the subDAG 26b by forwarding the data packet to the subroot "N8" of the subDAG 26b associated with the subDAG instance identifier 56.

Hence, the subroots "N7" and "N8" can send route optimization instructions to each other (e.g., via the common subDAG child "N10") for inter-subDAG communications that bypass the root network device 12.

FIG. 3C illustrates example optimizations based on the overlapping subDAGs 26a and 26b. As described previously, the modified unicast DAO message 22' can hide the internal topology of the subDAGs 26 from the root network device 12. Hence, the root network device 12 in operation 80 can reach a child network device in the DODAG 18 (e.g., "N17") based on generating a source-route header to the subroot 24 "N8" (e.g., "N3-N6-N8") and inserting the source route header in a data packet to specify the data packet is destined for the child network device "N17" via the truncated source-route path "N3-N6-N8" specified in the source-route header, and outputting the data packet to its next-hop child network device "N3" 14.

A subDAG child (e.g., "N16" of FIG. 1C) in the subDAG 26b also can generate and output in operation 82 an intra-subDAG data packet 84 (destined for the subDAG child "N17") that optionally can specify the corresponding subDAG instance identifier 56 of the subDAG 26b, causing the common subDAG child "N10" to forward the intra-subDAG data packet 84 to the subroot "N8" 24 associated with the subDAG 26b. In response to receiving the intra-subDAG data packet 84 specifying the corresponding subDAG instance identifier 56 of the subDAG 26b, the common subDAG child N10" can associate the subDAG instance identifier 56 with the subDAG 26b, and in response forward the intra-subDAG data packet 84 to the subroot "N8" 24 of the subDAG 26b.

Hence, the subroot "N8" 24, in response to receiving in operation 86 a data packet from the root network device 12 (in operation 80) or a subDAG child (in operation 82) can access its local route entry for the destination device "N17", and generate in operation 88 a subDAG routing header for reaching the destination subDAG child "N17" via the neighboring subDAG child "N13". The subroot "N8" 24 in operation 88 can insert the subDAG routing header (e.g., based on replacing the source-route header generated by the root network device 12 with the subDAG routing header), and output in operation 88 the data packet containing the subDAG routing header for delivery to the subDAG child "N17" via the neighboring subDAG child "N13".

Figure 1C:
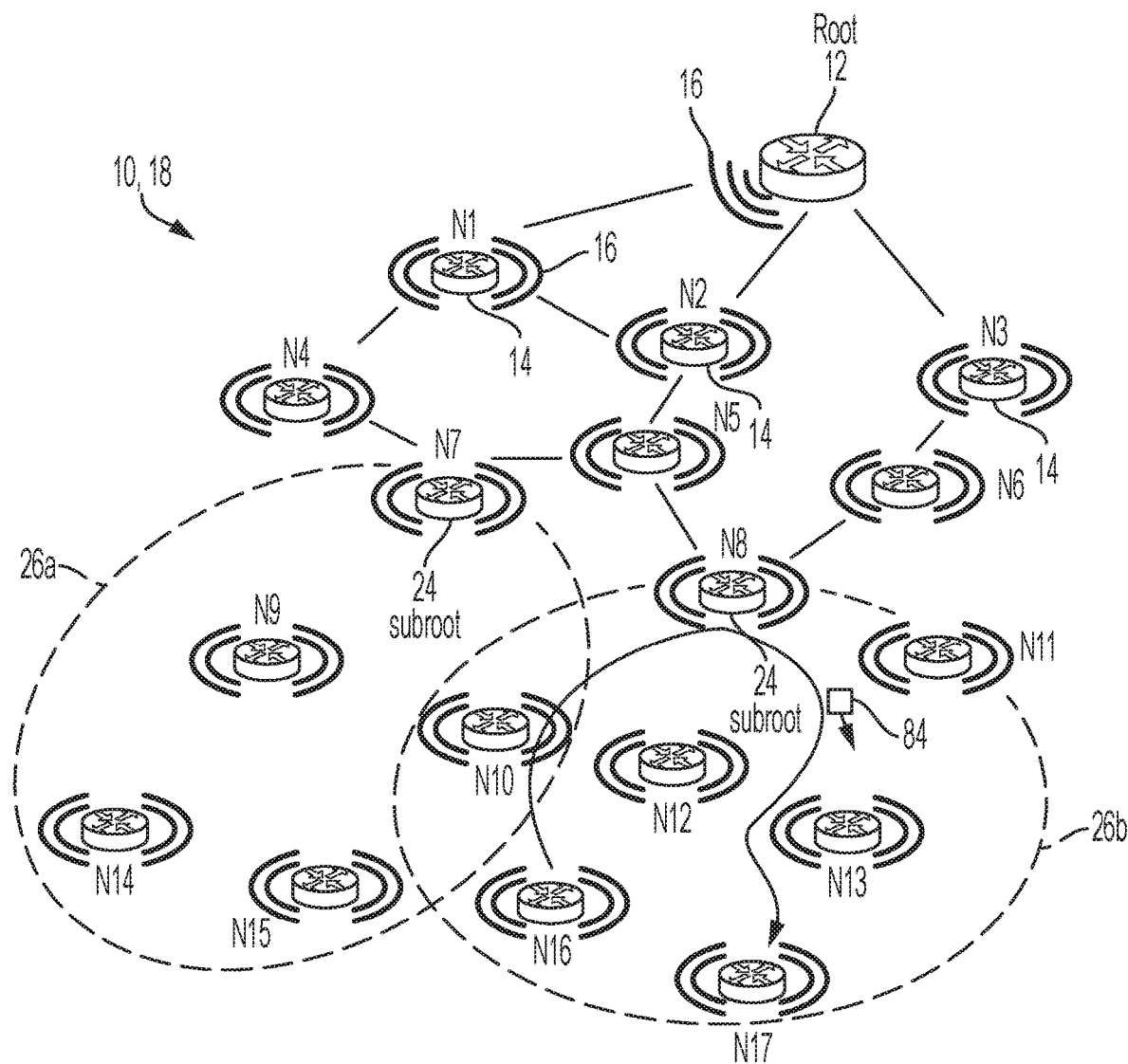
Figure 1D:
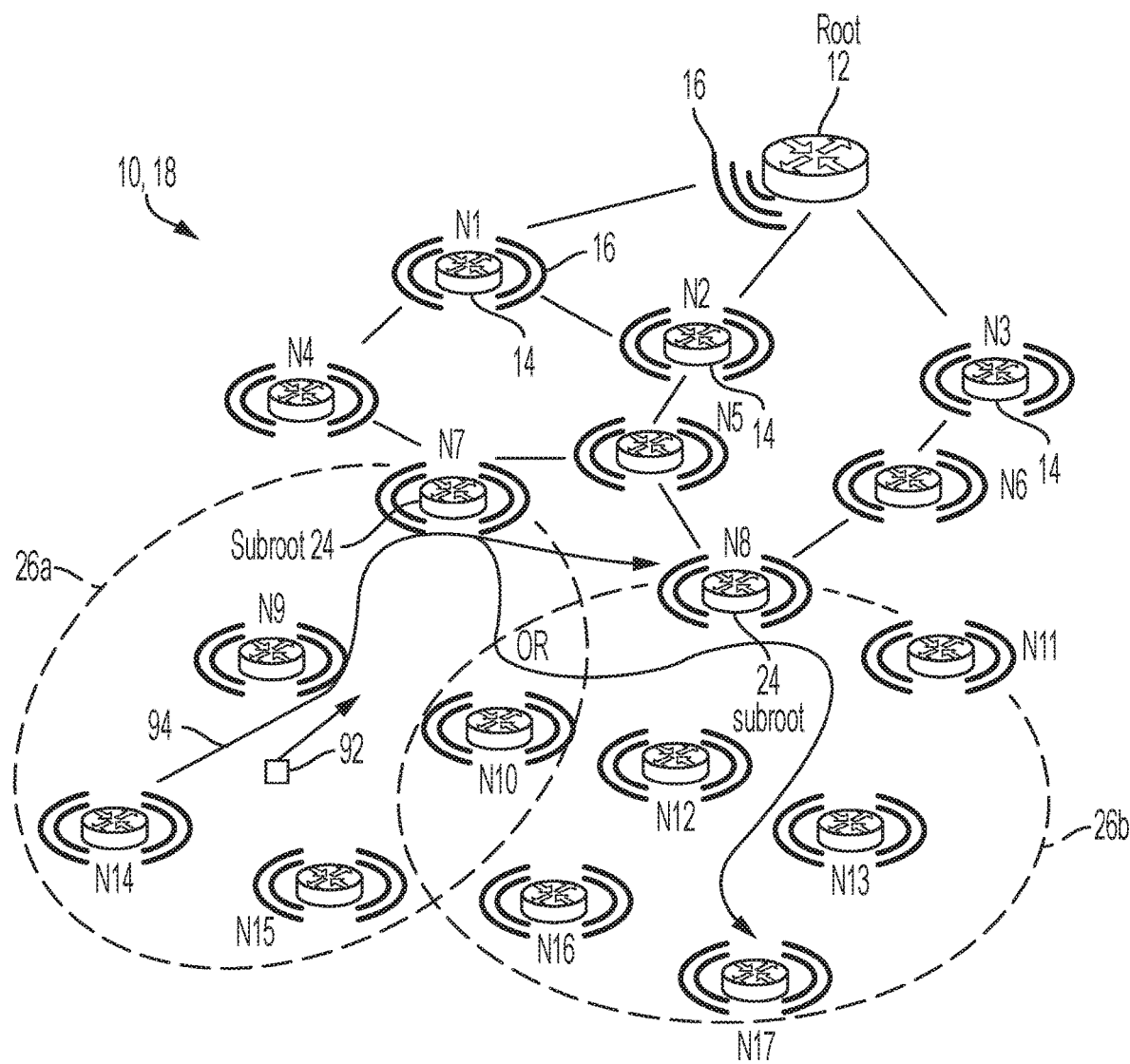

Hence, subDAG communications can be completed by the subroot 24 in operation 88, as illustrated in FIG. 1C, bypassing the root network device 12. A source subDAG child device (e.g., "N16") in the subDAG 26b can send in operation 82 an intra-subDAG data packet 84 destined for the subDAG child "N17" that can specify the corresponding subDAG instance identifier 56 of the subDAG 26b, causing the common subDAG child "N10" to forward the intra-subDAG data packet 84 to the subroot "N8" 24 associated with the subDAG 26b in response to detecting the subDAG instance identifier 56. The subroot "N8" 24 in operation 86 can respond to reception of the intra-subDAG data packet 84 by determining in operation 88 that it has a route for reaching the destination child device "N17", and insert into the intra-subDAG data packet 84 the subDAG routing header for reaching the destination child device "N7" via the neighboring child device "N13".

Route optimization also can be executed in a reactive manner as opposed to the proactive route optimization of operations 76 and 78. Assuming the data packet 84 in FIG. 1C that is destined for the subDAG child "N17" did not include the subDAG instance identifier 56 associated with the subDAG 26b, it is possible the common subDAG child "N10" could forward a data packet to its other subDAG parent "N7" 24 instead of the subDAG parent "N8" if the common child network device did not have any instructions for forwarding a data packet to the subDAG parent "N8" for any destination associated with the subDAG 26 (or the associated subDAG instance identifier 56). Hence, if the subroot "N7" 24 received the data packet and did not previously have the above-described route optimization instructions, the subroot "N7" 24 could forward the data packet along its default path toward the root network device 12; the data packet also could have originated from another network device in another unknown subDAG that does not have a common child device attached to overlapping subDAGs 26. Hence, reception of the data packet would cause the root 12 to forward the data packet as described previously with respect to operation 80.

Hence, in one example, the processor circuit of the root network device 12 in operation 90 can respond to receiving data packet by unicast transmitting to the common subDAG child "N10" an instruction to forward to the subroot "N8" 24 (or to use the associated subDAG instance identifier 56 for the subDAG 26*b*) for all data packets destined for any destination associated with the subDAG 26*b* (e.g., "N8, N11, N12, N13, N16, and/or N17" via "N8"). Hence, the common subDAG child can respond to the instruction by storing a route entry that any destination associated with the subDAG 26*b* (e.g., "N8, N11, N12, N13, N16, and/or N17") is reachable via the subroot "N8" 24 (or the associated subDAG instance identifier 56 for the subDAG 26*b*).

If the data packet received by the root network device 12 is from a source network device outside the destination subDAG 26*b* (e.g., from network device "N14" in a source subDAG 26*a*), the root network device 12 in operation 90 can send an instruction to the subroot 24 (e.g., "N7") of the source subDAG (e.g., 26*a*) to forward any data packet destined for any destination in the subDAG 26*b* (e.g., "N8, N10, N11, N12, N13, N16, and/or N17") via a common subDAG child (e.g., "N10"), or via a common parent (e.g., "N5"). Hence, the subroot "N7" can respond to the instruction by storing a route entry that any destination associated with the subDAG 26*b* (e.g., "N8, N10, N11, N12, N13, N16, and/or N17" via "N8") is reachable via the common subDAG child (e.g., "N10"), and/or via a common parent (e.g., "N5").

In another example, the subroot "N8" 24 also can execute reactive route optimization. For example, in response to receiving the data packet originated by the source (e.g., "N14"), the subroot "N8" 24, in addition to forwarding the data packet in operation 88, can execute reactive route optimization in operation 90 based on learning the topology of the source network device "N14", for example based on sending a query to the root network device 12 for a path to reach the source network device "N14" (e.g., to determine a hop-by-path for between the source network device "N14" and the root network device 12): the root network device 12 can respond the query by sending, to the requesting subroot "N8" 24, topology information indicating a hop-by-hop path between the source network device "N14" and the root network device 12. If in operation 90 the subroot "N8" detects any common parent (e.g., "N5") or known peer subroot (e.g., "N7") in the topology information received from the root network device 12, the subroot "N8" can send instructions to the common parent and/or known peer subroot "N7" to identify any common subDAG child network device (e.g., "N10") as providing reachability to the **\*\*. The subroot "N8" 24 in operation 90 can send the route optimization instructions to any one of the common parent "N5", the peer subroot "N7", and/or the common subDAG child "N10" as described previously with respect to operations 76 and 78. Hence, the route optimization instructions to the common parent "N5", the peer subroot "N7", and optionally the common subDAG child, enables an inter-subDAG data packet 92 to be transmitted via an inter-subDAG path 94 (via the peer subroot "N7") that bypasses the root network device 12, for example from the subDAG 26***a* to the neighboring subDAG 26*b* (either directly to the subroot "N8" 24 via local link or via the common subDAG child "N10"). The example embodiments enable intra- and inter-subDAG data traffic to be maintained, even if a failure in the root network device 12 is encountered. The example embodiments also substantially reduce the traffic load on the root network device 12, thereby improving reliability and scalability in the DODAG 18 and the wireless mesh data network 10 overall.

According to example embodiments, traffic can be propagated along optimized routes within a non-storing DODAG to reduce data traffic via a root network device. The example embodiments enable a network device (e.g., the root network device) to cause a source network device to send a packet to a common parent device (i.e., a common parent for the source network device and a destination network device) along the optimized route, instead of an alternate parent device, for optimized propagation of data packets between a source network device and a destination network device; in example embodiments the route optimization can be executed without explicit identification of a subroot or a subDAG.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   joining, by a wireless network device in a wireless data network, to a non-storing mode destination-oriented directed acyclic graph (DODAG) in response to receiving a multicast DODAG information object (DIO) message originated by a root network device;
   generating and transmitting, by the wireless network device, a unicast destination advertisement (DAO) message destined for the root network device and indicating the wireless network device has joined the DODAG;
   advertising, by the wireless network device, as a subroot of a subDAG in the DODAG, based on generating and outputting a second message specifying subDAG information identifying the subDAG;
   receiving a second unicast DAO message generated by a child network device in the subDAG and addressed to the wireless network device, the second unicast DAO message indicating the child network device has joined the subDAG; and
   generating and sending, by the wireless network device, a third unicast DAO message to the root network device specifying the child network device is reachable via the wireless network device.

2. The method of claim 1, further comprising:
   storing, by the wireless network device, reachability information for reaching the child network device in the subDAG based on the second unicast DAO message;
   receiving, by the wireless network device, a data packet transmitted by the root network device and including a source routing header that targets the child network device via the subroot;
   updating the data packet based on replacing, by the wireless network device, the source routing header in the data packet with a subDAG routing header for reaching the child network device in the subDAG, and outputting the updated data packet containing the subDAG routing header, for delivery to the child network device in the subDAG.

3. The method of claim 1, further comprising:
responding, by the wireless network device, to the second unicast DAO message by creating and storing a route entry for reaching the child network device in the subDAG;
receiving, by the wireless network device, a data packet destined for the child network device; and
forwarding the data packet to the child network device, via the subDAG, based on accessing the route entry in response to detecting the child network device is in the subDAG, the forwarding causing the data packet to bypass the root network device.

4. The method of claim 1, wherein the second message specifies:
a DODAG identifier for the DODAG and a DODAG rank identifying a corresponding rank of the wireless network device in the DODAG;
the subDAG information specifying a subDAG identifier distinct from the DODAG identifier and identifying the subDAG, and the subDAG information further specifying a subDAG rank distinct from the DODAG Rank and identifying a corresponding rank of the wireless network device in the subDAG, and a mode identifier specifying the subDAG is operating in non-storing mode.

5. The method of claim 1, wherein the subDAG information specifies a subDAG instance identifier that is associated with the subDAG as a local instance of the subDAG in the DODAG, the subDAG instance identifier causing network devices in the subDAG to use the subDAG instance identifier for routing within the subDAG.

6. The method of claim 1, further comprising the wireless network device unicast transmitting, to one of a source network device or another subroot of another subDAG, an instruction to send a data packet destined for the child network device via one of the wireless network device or another network device in the subDAG.

7. The method of claim 1, wherein:
the third unicast DAO message causes the root network device to specify, in a source routing header of a data packet destined for the child network device, hops between the root network device and the subroot without identification of any hops between the subroot and the child network device;
the wireless network device receives the second unicast DAO message via a neighboring second child device having joined the subDAG;
wherein the wireless network device hides, from the root network device, a corresponding topology of the subDAG in which the child network device is reachable by the wireless network device via the neighboring second child device.

8. An apparatus implemented as a physical machine, the apparatus comprising:
non-transitory machine readable media configured for storing executable machine readable code;
a device interface circuit configured for receiving a multicast destination-oriented directed acyclic graph (DODAG) information object (DIO) message originated by a root network device in a wireless data network; and
a processor circuit configured for executing the machine readable code, and when executing the machine readable code operable for:
joining, by the apparatus implemented as a wireless network device, to a non-storing DODAG in response to receiving the multicast DIO message,
generating a unicast destination advertisement (DAO) message destined for the root network device and indicating the wireless network device has joined the DODAG;
advertising as a subroot of a subDAG in the DODAG, based on generating a second message specifying subDAG information identifying the subDAG;
receiving a second unicast DAO message generated by a child network device in the subDAG and addressed to the wireless network device, the second unicast DAO message indicating the child network device has joined the subDAG; and
generating and outputting a third unicast DAO message to the root network device specifying the child network device is reachable via the wireless network device.

9. The apparatus of claim 8, wherein the processor circuit is configured for:
storing, in the non-transitory machine readable media, reachability information for reaching the child network device in the subDAG based on the second unicast DAO message;
receiving a data packet transmitted by the root network device and including a source routing header that targets the child network device via the subroot;
updating the data packet based on replacing the source routing header in the data packet with a subDAG routing header for reaching the child network device in the subDAG, and outputting the updated data packet containing the subDAG routing header, for delivery to the child network device in the subDAG.

10. The apparatus of claim 8, wherein the processor circuit is configured for:
responding to the second unicast DAO message by creating and storing a route entry for reaching the child network device in the subDAG;
receiving a data packet destined for the child network device; and
forwarding the data packet to the child network device, via the subDAG, based on accessing the route entry in response to detecting the child network device is in the subDAG, the forwarding causing the data packet to bypass the root network device.

11. The apparatus of claim 8, wherein the second message specifies:
a DODAG identifier for the DODAG and a DODAG rank identifying a corresponding rank of the wireless network device in the DODAG;
the subDAG information specifying a subDAG identifier distinct from the DODAG identifier and identifying the subDAG, and the subDAG information further specifying a subDAG rank distinct from the DODAG Rank and identifying a corresponding rank of the wireless network device in the subDAG, and a mode identifier specifying the subDAG is operating in non-storing mode.

12. The apparatus of claim 8, wherein the subDAG information specifies a subDAG instance identifier that is associated with the subDAG as a local instance of the subDAG in the DODAG, the subDAG instance identifier causing network devices in the subDAG to use the subDAG instance identifier for routing within the subDAG.

13. The apparatus of claim 8, wherein the processor circuit is configured for generating and causing unicast transmitting, to one of a source network device or another subroot of another subDAG, an instruction to send a data packet destined for the child network device via one of the wireless network device or another network device in the subDAG.

14. The apparatus of claim 8, wherein:
the third unicast DAO message causes the root network device to specify, in a source routing header of a data packet destined for the child network device, hops between the root network device and the subroot without identification of any hops between the subroot and the child network device;
the wireless network device receives the second unicast DAO message via a neighboring second child device having joined the subDAG;
wherein the wireless network device hides, from the root network device, a corresponding topology of the subDAG in which the child network device is reachable by the wireless network device via the neighboring second child device.

15. One or more non-transitory tangible media encoded with logic for execution by a machine and when executed by the machine operable for:
joining, by the machine implemented as a wireless network device in a wireless data network, to a non-storing mode destination-oriented directed acyclic graph (DODAG) in response to receiving a multicast DODAG information object (DIO) message originated by a root network device;
generating and transmitting, by the wireless network device, a unicast destination advertisement (DAO) message destined for the root network device and indicating the wireless network device has joined the DODAG;
advertising, by the wireless network device, as a subroot of a subDAG in the DODAG, based on generating and outputting a second message specifying subDAG information identifying the subDAG;
receiving a second unicast DAO message generated by a child network device in the subDAG and addressed to the wireless network device, the second unicast DAO message indicating the child network device has joined the subDAG; and
generating and sending, by the wireless network device, a third unicast DAO message to the root network device specifying the child network device is reachable via the wireless network device.

16. The one or more non-transitory tangible media of claim 15, further operable for:
storing, by the wireless network device, reachability information for reaching the child network device in the subDAG based on the second unicast DAO message;
receiving, by the wireless network device, a data packet transmitted by the root network device and including a source routing header that targets the child network device via the subroot;
updating the data packet based on replacing, by the wireless network device, the source routing header in the data packet with a subDAG routing header for reaching the child network device in the subDAG, and outputting the updated data packet containing the subDAG routing header, for delivery to the child network device in the subDAG.

17. The one or more non-transitory tangible media of claim 15, further operable for:
responding, by the wireless network device, to the second unicast DAO message by creating and storing a route entry for reaching the child network device in the subDAG;
receiving, by the wireless network device, a data packet destined for the child network device; and
forwarding the data packet to the child network device, via the subDAG, based on accessing the route entry in response to detecting the child network device is in the subDAG, the forwarding causing the data packet to bypass the root network device.

18. The one or more non-transitory tangible media of claim 15, wherein the second message specifies:
a DODAG identifier for the DODAG and a DODAG rank identifying a corresponding rank of the wireless network device in the DODAG;
the subDAG information specifying a subDAG identifier distinct from the DODAG identifier and identifying the subDAG, and the subDAG information further specifying a subDAG rank distinct from the DODAG Rank and identifying a corresponding rank of the wireless network device in the subDAG, and a mode identifier specifying the subDAG is operating in non-storing mode.

19. The one or more non-transitory tangible media of claim 15, further operable for the wireless network device unicast transmitting, to one of a source network device or another subroot of another subDAG, an instruction to send a data packet destined for the child network device via one of the wireless network device or another network device in the subDAG.

20. The one or more non-transitory tangible media of claim 15, wherein:
the third unicast DAO message causes the root network device to specify, in a source routing header of a data packet destined for the child network device, hops between the root network device and the subroot without identification of any hops between the subroot and the child network device;
the wireless network device receives the second unicast DAO message via a neighboring second child device having joined the subDAG;
wherein the wireless network device hides, from the root network device, a corresponding topology of the subDAG in which the child network device is reachable by the wireless network device via the neighboring second child device.

* * * * *